United States Patent
Watanabe

(10) Patent No.: US 7,160,208 B2
(45) Date of Patent: Jan. 9, 2007

(54) THREE-PIECE SOLID GOLF BALL

(75) Inventor: Hideo Watanabe, Chichibu (JP)

(73) Assignee: Bridgestone Sports Co., Ltd, Tokyo (JP)

( * ) Notice: Subject to any disclaimer, the term of this patent is extended or adjusted under 35 U.S.C. 154(b) by 220 days.

(21) Appl. No.: 10/322,510

(22) Filed: Dec. 19, 2002

(65) Prior Publication Data

US 2003/0130065 A1    Jul. 10, 2003

(30) Foreign Application Priority Data

Dec. 28, 2001  (JP)  ............................. 2001-398997

(51) Int. Cl.
   A63B 37/04    (2006.01)
   A63B 37/06    (2006.01)

(52) U.S. Cl. ...................... 473/377; 473/371

(58) Field of Classification Search ......... 475/351–378
   See application file for complete search history.

(56) References Cited

U.S. PATENT DOCUMENTS

| | | | | |
|---|---|---|---|---|
| 5,002,281 A | * | 3/1991 | Nakahara et al. | 473/373 |
| 5,026,067 A | * | 6/1991 | Gentiluomo | 473/374 |
| 5,711,723 A | * | 1/1998 | Hiraoka et al. | 473/374 |
| 5,752,889 A | | 5/1998 | Yamagishi et al. | |
| 5,782,707 A | * | 7/1998 | Yamagishi et al. | 473/374 |
| 5,830,085 A | * | 11/1998 | Higuchi et al. | 473/373 |
| 6,123,628 A | * | 9/2000 | Ichikawa et al. | 473/371 |
| 6,180,722 B1 | * | 1/2001 | Dalton et al. | 525/193 |
| 6,248,029 B1 | * | 6/2001 | Maruko | 473/374 |
| 6,390,935 B1 | * | 5/2002 | Sugimoto | 473/373 |
| 6,544,131 B1 | * | 4/2003 | Sano et al. | 473/374 |
| 6,790,148 B1 | * | 9/2004 | Yoshida et al. | 473/374 |
| 6,845,878 B1 | * | 1/2005 | Hayes et al. | 473/373 |

FOREIGN PATENT DOCUMENTS

| | | |
|---|---|---|
| JP | 59-194760 A | 11/1984 |
| JP | 60-241464 A | 11/1985 |
| JP | 62-181069 A | 8/1987 |
| JP | 64-80377 A | 3/1989 |
| JP | 2-228978 A | 9/1990 |
| JP | 2-264674 A | 10/1990 |
| JP | 9-215778 A | 8/1997 |

* cited by examiner

*Primary Examiner*—Eugene Kim
*Assistant Examiner*—Alvin A. Hunter, Jr.
(74) *Attorney, Agent, or Firm*—Sughrue Mion, PLLC

(57) ABSTRACT

A three-piece solid golf ball comprising a rubber-based core inner layer, a rubber-based core outer layer, and a polyurethane elastomer-based cover, wherein the core inner layer has a JIS-C hardness of 50–85, the core outer layer has a JIS-C hardness of 70–90, the JIS-C hardness of the core outer layer at its surface minus the JIS-C hardness of the core inner layer at its center is 20–30, and the cover has a Shore D hardness of 46–55 and a gage of 1.1–2.1 mm is improved in rebound, travel distance, controllability, feel on impact and durability.

3 Claims, No Drawings

THREE-PIECE SOLID GOLF BALL

This invention relates to three-piece solid golf balls having improved spin, feel, durability, rebound and travel distance.

BACKGROUND OF THE INVENTION

Three-piece solid golf balls in which a dual-layer core consisting of core inner and outer layers formed of rubber compositions is enclosed with a cover are known in the art as disclosed in JP-A 59-194760, JP-A 60-241464, JP-A 62-181069, JP-A 64-80377, JP-A 2-228978, and JP-A 2-264674.

However, the three-piece solid golf balls of these patents do not satisfy the spin performance on iron and approach shots required by skilled amateur and professional golfers partially because the cover is hard. The cover is often formed of ionomer resins. Further improvements in scuff resistance are desired, and further investigations to find a better compromise between feel and flight performance are needed.

SUMMARY OF THE INVENTION

An object of the present invention is to provide a three-piece solid golf ball which is endowed with a good profile of flight, spin, feel and scuff resistance so as to satisfy skilled amateur and professional golfers.

It has been found that by enclosing a dual-layer core of core inner and outer layers formed of rubber compositions with a soft urethane cover to construct a three-piece solid golf ball while optimizing the hardness and hardness difference of the core inner and outer layers as well as the hardness of the cover, the three-piece solid golf ball is improved in spin, feel, durability and travel distance. Better results are obtained by optimizing the specific gravity of the core inner and outer layers and cover and compounding a polyurethane elastomer with a specific isocyanate mixture in the cover.

JP-A 9-215778 discloses a two-piece solid golf ball having a urethane cover, which is still insufficient in spin performance, feel, durability and flight performance. With respect to all these performance factors, the solid golf ball of the present invention drastically surpasses such prior art urethane cover balls.

According to the invention, there is provided a three-piece solid golf ball comprising a core inner layer formed of a rubber composition, a core outer layer enclosing the core inner layer and formed of another rubber composition, and a cover enclosing the core outer layer and formed mainly of a polyurethane elastomer. The core inner layer has a JIS-C hardness of 50 to 85, the core outer layer has a JIS-C hardness of 70 to 90, and the difference between the JIS-C hardness H0 of the core outer layer at its surface and the JIS-C hardness H1 of the core inner layer at its center, given as H0-H1, is 20 to 30 units. The cover has a Shore D hardness of 46 to 55 and a gage of 1.1 to 2.1 mm.

In a preferred embodiment, the core inner layer has a diameter of 29 to 36 mm. Also preferably, the core inner layer has a specific gravity of more than 1.0, the core outer layer has a specific gravity which is equal to or greater than that of the core inner layer, and the cover has a specific gravity which is highest among others.

The cover is desirably formed of a composition comprising, in admixture, (A) the polyurethane elastomer and (B) an isocyanate mixture of an isocyanate compound having at least two isocyanate groups as functional groups in a molecule, dispersed in a thermoplastic resin which is substantially non-reactive with the isocyanate groups.

DESCRIPTION OF THE PREFERRED EMBODIMENTS

In the three-piece solid golf ball of the invention, the core is a dual-layer core consisting of a core inner layer and a core outer layer enclosing the inner layer, both formed of rubber compositions.

The rubber compositions of which the core inner and outer layers are formed are preferably based on polybutadiene. The preferred polybutadiene has a cis-1,4 content of at least 40%, and more preferably at least 90%. The polybutadiene may be compounded with another diene rubber such as polyisoprene, styrene-butadiene rubber or natural rubber although it is preferred that the polybutadiene constitute at least 50% by weight, especially at least 70% by weight of the base rubber.

In addition to the base rubber, the rubber composition contains crosslinking agents. Examples include zinc salts of unsaturated fatty acids such as zinc acrylate and zinc methacrylate, magnesium salts of unsaturated fatty acids, other metal salts thereof, and esters thereof such as triethanolpropane methacrylate, and unsaturated fatty acids such as methacrylic acid. The crosslinking agents are preferably included in amounts of 15 to 50 parts by weight per 100 parts by weight of the base rubber.

Also included in the rubber composition are organic peroxides such as dicumyl peroxide, preferably in amounts of 0.1 to 3 parts by weight per 100 parts by weight of the base rubber. Further, vulcanizing agents such as organic sulfur compounds, e.g., the zinc salt of pentachlorothiophenol and diphenyl disulfide are desirably compounded for improving resilience, preferably in amounts of 0.1 to 5 parts by weight, more preferably 0.2 to 3 parts by weight, per 100 parts by weight of the base rubber.

If necessary, antioxidants such as 2,2-methylene-bis(4-methyl-6-tert-butylphenol) and fillers for specific gravity adjustment such as zinc oxide, barium sulfate and calcium carbonate may be compounded in the rubber composition. The fillers are generally compounded in amounts of up to 130 parts by weight per 100 parts by weight of the base rubber, with amounts of less than 50 parts by weight being preferred for resilience and the like. The more preferred amount of filler is up to 30 parts, especially up to 20 parts by weight per 100 parts by weight of the base rubber. The lower limit amount of the filler, if used, is at least 1 part, preferably at least 5 parts, and can be even more than 10 parts by weight. Barium sulfate and zinc oxide are often used for specific gravity adjustment although it is preferred for additional resilience improvement to use zinc oxide as a major component and restrict the amount of barium sulfate to 10 parts by weight or less, and especially to 0 part.

The rubber composition may be prepared by mixing the above-mentioned components in a conventional mixer, for example, a Banbury mixer, kneader or roll mill. The resulting compound is molded into the desired shape, as by compression molding or injection molding. Vulcanization may be performed at 130 to 180° C. for 60 to 10 minutes.

The core inner layer is a sphere preferably having a diameter of 29 to 36 mm, and especially 31 to 34 mm. Outside the range, a smaller diameter may lead to a hard feel on impact and poor rebound, failing to travel a distance. A larger diameter may lead to a very soft feel on impact and a decline of crack durability against repeated shots.

The core inner layer at an arbitrary position has a JIS-C hardness of at least 50, preferably at least 55, more preferably at least 58 and even more preferably at least 60, and up to 85, preferably up to 82, more preferably up to 80. Too low a hardness leads to a very soft feel on driver shots, low rebound and poor flight performance. A decline of crack durability against repeated shots is another result. Too high a hardness leads to a very hard feel on driver shots, more spin and an ascendant trajectory, failing to travel a distance.

In the setup enclosing the core inner layer, the core outer layer preferably has a diameter of at least 38.5 mm, and especially at least 39.0 mm, with the upper limit being 40.5 mm or less. If the diameter of the core outer layer enclosing the core inner layer is too small, the cover must be thicker, which may sometimes lead to poor rebound, failing to travel a distance. If the diameter of the core outer layer is too large, the cover must be thinner, which may sometimes lead to poor scuff resistance and a very hard feel on putter shots.

The core outer layer has a JIS-C hardness of at least 70, preferably at least 77, and up to 90, preferably up to 85. Too low a hardness affords more spin on driver shots, failing to travel a distance. And the increased hardness difference at the interface with the cover inner layer may incur a decline of crack durability against repeated shots. On the other hand, too high a hardness leads to a very hard feel on impact and poor scuff resistance.

According to the invention, the difference between the JIS-C hardness H0 of the core outer layer at its surface and the JIS-C hardness H1 of the core inner layer at its center, given as H0-H1, should be at least 20 units, preferably at least 22 units and up to 30 units, preferably up to 26 units (JIS-C hardness units). Too small a difference (H0-H1) leads to more spin on driver shots, failing to travel a distance. Too large a difference (H0-H1) leads to poor rebound, distance shortage, and a decline of crack durability against repeated shots.

Referring to the specific gravity of the core inner and outer layers, the core inner layer preferably has a specific gravity of more than 1.0. The core outer layer has a specific gravity S0 which is equal to or greater than the specific gravity S1 of the core inner layer, and more preferably satisfies $0 \leq S0-S1 \leq 0.06$. The adjustment of specific gravity in this range ensures to form the core without increasing the variation of hardness in the inner and/or outer layer, and offers good rebound and thus enables to travel a longer distance. In particular, with the adjustment of specific gravity in the range: $0 \leq S0-S1 \leq 0.06$ which means that the specific gravity of the core inner layer is substantially equal to that of the core outer layer, the dual-layer core is given maximum resilience or rebound.

In the three-piece solid golf ball of the invention, the cover is formed mainly of a polyurethane elastomer whereby the objects of the invention are effectively achieved. The polyurethane elastomer used herein may be any of well-known elastomers. In a preferred embodiment, the cover is formed of a molding composition comprising (A) a thermoplastic polyurethane material and (B) an isocyanate mixture of (b-1) an isocyanate compound having at least two isocyanate groups as functional groups in a molecule, dispersed in (b-2) a thermoplastic resin which is substantially non-reactive with isocyanate.

When the cover is formed of the above molding composition, golf balls having better feel, controllability, cut resistance, scuff resistance, and crack durability against repeated shots are obtainable.

Components (A) and (B) are described in detail.

(A) Thermoplastic Polyurethane Material

The thermoplastic polyurethane materials used herein are constructed of polymeric polyols (or polymeric glycols) as the soft segments, and chain extenders and diisocyanates as the hard segments. Any polymeric polyol employed in the prior art relating to thermoplastic polyurethane materials may be used as the starting reactant without particular limitation. Examples include polyester polyols and polyether polyols. Of these, polyether polyols are preferred to polyester polyols for the preparation of thermoplastic polyurethanes having a high modulus of resilience and good low-temperature properties. Suitable examples of polyether polyols include polytetramethylene glycol and polypropylene glycol. Polytetramethylene glycol is preferred for modulus of resilience and low-temperature properties. These polymeric polyols preferably have an average molecular weight of 1,000 to 5,000, with an average molecular weight of 2,000 to 4,000 being especially preferred for the preparation of thermoplastic polyurethanes having a high modulus of resilience.

Any chain extender employed in the prior art relating to thermoplastic polyurethane materials may be used. Exemplary chain extenders include, but are not limited to, polyhydric alcohols such as 1,4-butylene glycol, 1,2-ethylene glycol, 1,3-butanediol, 1,6-hexanediol and 2,2-dimethyl-1,3-propanediol. These chain extenders preferably have an average molecular weight of 20 to 15,000.

Any diisocyanate employed in the prior art relating to thermoplastic polyurethane materials may be used. Illustrative examples include, but are not limited to, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. However, some isocyanate compounds can make it difficult to control the crosslinking reaction during injection molding. In the practice of the invention, the use of 4,4'-diphenylmethane diisocyanate as a typical aromatic diisocyanate is most preferred for consistent reactivity with the isocyanate mixture (B) to be described later.

Commercial products may be used as the above-described thermoplastic polyurethane material. Illustrative examples include Pandex T8290, T8295 and T8260 (manufactured by DIC Bayer Polymer, Ltd.), and Resamine 2593 and 2597 (manufactured by Dainichi Seika Colour & Chemicals Mfg. Co., Ltd.).

(B) Isocyanate Mixture

The isocyanate mixture (B) is one prepared by dispersing (b-1) an isocyanate compound having as functional groups at least two isocyanate groups per molecule in (b-2) a thermoplastic resin that is substantially non-reactive with isocyanate. The isocyanate compound (b-1) may be any of diisocyanate compounds used in the prior art relating to thermoplastic polyurethanes, for example, aromatic diisocyanates such as 4,4'-diphenylmethane diisocyanate (MDI), 2,4-toluene diisocyanate and 2,6-toluene diisocyanate, and aliphatic diisocyanates such as hexamethylene diisocyanate. Of these, 4,4'-diphenylmethane diisocyanate is most preferred for reactivity and handling safety.

The thermoplastic resin (b-2) that is substantially non-reactive with isocyanate is preferably a resin having a low water absorption and excellent compatibility with thermoplastic polyurethane materials. Illustrative, non-limiting, examples of such resins include polystyrene resins, polyvinyl chloride resins, ABS resins, polycarbonate resins, and polyester elastomers (e.g., polyether-ester block copolymers, polyester-ester block copolymers). From the resilience and strength standpoints, preference is given to polyester elastomers, especially polyether-ester block copolymers.

In the isocyanate mixture (B), it is preferred to mix the thermoplastic resin (b-2) with the isocyanate compound (b-1) in a weight ratio of from 100:5 to 100:100, and especially from 100:10 to 100:40. If the amount of isocyanate component (b-1) relative to thermoplastic resin (b-2) is too small, more isocyanate mixture (B) must be added to achieve sufficient addition for the crosslinking reaction with the thermoplastic polyurethane (A). In such cases, thermoplastic resin (b-2) exerts a larger effect, which may render inadequate the physical properties of the polyurethane molding composition serving as the cover stock. If the amount of isocyanate compound (b-1) relative to thermoplastic resin (b-2) is too large, isocyanate compound (b-1) may cause slippage to occur during mixing, making it difficult to prepare the isocyanate mixture (B).

The isocyanate mixture (B) can be prepared by blending isocyanate compound (b-1) into thermoplastic resin (b-2) and thoroughly working together these components at a temperature of 130 to 250° C. using mixing rollers or a Banbury mixer, followed by pelletization or cooling and grinding. The isocyanate mixture (B) is commercially available, for example, as Crossnate EM30 (made by Dainichi Seika Colour & Chemicals Mfg. Co., Ltd.).

(C) Molding Composition

The molding composition (C) of which the cover is made contains the thermoplastic polyurethane material (A) and the isocyanate mixture (B) as main components. In the preferred cover molding composition, the thermoplastic polyurethane material (A) and the isocyanate mixture (B) are mixed in a weight ratio of from 100:1 to 100:100, more preferably from 100:5 to 100:50, even more preferably from 100:10 to 100:30. If the amount of isocyanate mixture (B) relative to polyurethane (A) is too small, the crosslinking effect may become insufficient. If the amount of isocyanate mixture (B) is too large, unreacted isocyanate can cause undesirable coloration of the molded composition.

In addition to the above-mentioned components, the cover molding composition (C) may contain other components. Illustrative examples of such additional components include thermoplastic polymeric materials other than thermoplastic polyurethane, such as polyester elastomers, polyamide elastomers, ionomer resins, styrene block elastomers, polyethylene and nylon resins. The thermoplastic polymeric materials other than thermoplastic polyurethane are generally included in amounts of 0 to 100 parts by weight, preferably 10 to 75 parts by weight, and more preferably 10 to 50 parts by weight, per 100 parts by weight of the thermoplastic polyurethane material serving as the essential component. The type and amount of thermoplastic polymeric material are selected as appropriate for such purposes as adjusting the hardness of the cover and improving resilience, flow and adhesion. If necessary, the cover molding composition (C) may also include various additives such as pigments, dispersants, antioxidants, ultraviolet absorbers, light stabilizers and parting agents.

In the practice of the invention, the cover may be molded from the molding composition (C), for example, by adding isocyanate mixture (B) to thermoplastic polyurethane material (A) and dry mixing. Using an injection molding machine, the mixture is molded over the core to form a cover thereabout. Molding is generally carried out at a temperature in the range of 150 to 250° C., although the molding temperature will depend on the type of thermoplastic polyurethane material (A).

Reactions and crosslinking which take place in the cover thus obtained are believed to involve the reaction of isocyanate groups with hydroxyl groups remaining on the thermoplastic polyurethane material to form urethane bonds, or the addition reaction of isocyanate groups to urethane groups on the thermoplastic polyurethane material to form an allophanate or biuret crosslinked form. Although the crosslinking reaction has not yet proceeded to a sufficient degree immediately subsequent to injection molding of the cover molding composition (C), the crosslinking reaction can be forwarded by carrying out an annealing step after molding, in this way conferring the golf ball with useful cover characteristics. "Annealing," as used herein, refers to heat aging the cover at a certain temperature for a predetermined length of time, or aging the cover for a predetermined period at room temperature.

While the cover is formed mainly of the polyurethane elastomer, the cover should have a Shore D hardness of at least 46, preferably at least 47 and up to 55, preferably up to 52. It is noted that the hardness of the cover is that of a sheet into which the cover composition is molded. Too low a cover hardness leads to poor rebound and too much spin, resulting in a reduction of travel distance. Too high a cover hardness leads to insufficient spin performance on approach shots and compromises crack durability and scuff resistance.

The cover has a specific gravity which is greater than that of the core outer layer. That is, the specific gravity of the cover is the highest among the core inner layer, core outer layer and cover. Preferably, the specific gravity of the cover is at least 1.1, especially at least 1.12 and up to 1.4, especially up to 1.2. In the three-piece solid golf ball of the invention, when the specific gravities of the three components are in the range: 1.0<core inner layer's specific gravity≦core outer layer's specific gravity<cover's specific gravity and the cover's specific gravity≧1.1, improvements in rebound, travel distance and durability become notable.

The cover has a gage or radial thickness of at least 1.0 mm, preferably at least 1.2 mm and up to 2.1 mm, preferably up to 1.9 mm.

The three-piece solid golf balls of the invention can be manufactured by a conventional process. After molding of the cover, the balls may be polished and painted in a conventional manner.

The three-piece solid golf balls of the invention should have a diameter and a weight complying with the Rules of Golf, and can be formed to, for example, a diameter of not less than 42.67 mm and a weight of not greater than 45.93 g.

There have been described three-piece solid golf balls which are improved in rebound, travel distance, controllability, feel and durability.

EXAMPLE

Examples of the invention are given below by way of illustration and not by way of limitation.

Examples & Comparative Examples

By forming core inner layers from the compositions shown in Tables 1 and 2 in a conventional manner, and forming core outer layers therearound from the compositions shown in Tables 1 and 2, solid cores consisting of inner and outer layers were prepared to the parameters shown in Tables 4 and 5. Thereafter, the compositions shown in Table 3 were injection molded over the solid cores to form covers, obtaining golf balls having the parameters shown in Tables 4 and 5.

The golf balls were evaluated by the following tests, with the results shown in Tables 4 and 5.

Flight Performance:

The spin rate, carry and total distance for each ball were measured when the ball was struck at a head speed of 50 m/s (HS50) with a driver (W#1). The club used for this purpose was a Tour Stage X500 having a loft of 8° (made by Bridgestone Sports Co., Ltd.). A ball with a total distance of at least 264 m was rated as good "O" and a total distance of less than 264 m as poor "X."

Controllability:

The spin rate for each ball was measured on approach shots, i.e., when the ball was struck with a sand wedge (SW) at a head speed of 20 m/s (HS20). A ball with a spin rate of at least 5,650 rpm was rated as good "O,", a spin rate of from 5,400 rpm to less than 5,650 rpm as fair "Δ," and a spin rate of less than 5,400 rpm as poor "X."

Feel:

Each ball was actually shot by five professional golfers using a driver (W#1) and a putter (PT). The feel of the ball was rated as: good "O" when at least 4 of the 5 golfers thought the feel was good; and poor "X" when at least 4 of the 5 golfers thought the feel was too hard or too soft.

Durability Against Repeated Shots until a Decline of Initial Velocity:

Each ball was repeatedly struck with a driver (W#1) at a head speed of 50 m/s (HS50). The number of impacts was counted until ball rebound was consecutively reduced by 3%. An index of durability was computed based on a value of 100 for the number of impacts to the golf ball of Example 3. Each ball was rated as: good "O" when the index of durability is 95 or greater, and poor "X" when the index of durability is less than 95.

Scuff Resistance:

The ball was hit once with a pitching wedge (PW) with angular grooves at a head speed of 45 m/s. It was rated as: good "O" when usable again, fair "Δ" when difficult to decide, and poor "X" when no longer usable on account of surface damages.

TABLE 1

| | | | Example | | | | |
|---|---|---|---|---|---|---|---|
| | Components (pbw) | | 1 | 2 | 3 | 4 | 5 |
| Core inner layer formulation | Polybutadiene (JSR BR11) | | 100 | 100 | 100 | 100 | 100 |
| | Zinc acrylate | | 30.1 | 27.7 | 26.1 | 27.7 | 29.3 |
| | Peroxide (1)*[1] | | 0.6 | 0.6 | 0.6 | 0.6 | 0.6 |
| | Peroxide (2)*[2] | | 0.6 | 0.6 | 0.6 | 0.6 | 0.6 |
| | Antioxidant*[3] | | 0.2 | 0.2 | 0.2 | 0.2 | 0.2 |
| | Zinc oxide | | 5.5 | 6.3 | 11.7 | 9.1 | 7.2 |
| | Zinc salt of pentachlorothiophenol | | 1 | 1 | 1 | 1 | 1 |
| | Zinc stearate | | 5 | 5 | 5 | 5 | 5 |
| | Vulcanization | Temp. | 157° C. | 157° C. | 157° C. | 157° C. | 157° C. |
| | | Time | 15 min | 15 min | 15 min | 15 min | 15 min |
| Core outer layer formulation *4 | Polybutadiene (JSR BR11) | | 100 | 100 | 100 | 100 | 100 |
| | Zinc acrylate | | 38.1 | 41.9 | 38.1 | 38.1 | 39.3 |
| | Peroxide (1)*[1] | | 0.6 | 0.6 | 0.6 | 0.6 | 0.6 |
| | Peroxide (2)*[2] | | 0.6 | 0.6 | 0.6 | 0.6 | 0.6 |
| | Antioxidant*[3] | | 0.2 | 0.2 | 0.2 | 0.2 | 0.2 |
| | Zinc oxide | | 11.9 | 10.2 | 8.5 | 10.2 | 11.3 |
| | Zinc salt of pentachlorothiophenol | | 1 | 1 | 1 | 1 | 1 |
| | Vulcanization | Temp. | 157° C. | 157° C. | 157° C. | 157° C. | 157° C. |
| | | Time | 15 min | 15 min | 15 min | 15 min | 15 min |

TABLE 2

| Components | | | Comparative Example | | | | | | | | | | |
|---|---|---|---|---|---|---|---|---|---|---|---|---|---|
| | (pbw) | | 1 | 2 | 3 | 4 | 5 | 6 | 7 | 8 | 9 | 10 | 11 |
| Core inner layer formulation | Polybutadiene (JSR BR11) | | 100 | 100 | 100 | 100 | 100 | 100 | 100 | 100 | 100 | 100 | 100 |
| | Zinc acrylate | | 27.7 | 17.4 | 40.4 | 30.1 | 31.7 | 21.4 | 31.7 | 31.7 | 26.1 | 30.1 | 30.1 |
| | Peroxide (1)* | | 0.6 | 0.6 | 0.6 | 0.6 | 0.6 | 0.6 | 0.6 | 0.6 | 0.6 | 0.6 | 0.6 |
| | Peroxide (2)* | | 0.6 | 0.6 | 0.6 | 0.6 | 0.6 | 0.6 | 0.6 | 0.6 | 0.6 | 0.6 | 0.6 |
| | Antioxidant* | | 0.2 | 0.2 | 0.2 | 0.2 | 0.2 | 0.2 | 0.2 | 0.2 | 0.2 | 0.2 | 0.2 |
| | Zinc oxide | | 8.8 | 14.5 | 5.8 | 8.9 | 5.6 | 12.2 | 6.0 | 6.3 | 14.7 | 14.5 | 9.2 |
| | Zinc salt of pentachlorothiophenol | | 1 | 1 | 1 | 1 | 1 | 1 | 1 | 1 | 1 | 1 | 1 |
| | Zinc stearate | | 5 | 5 | 5 | 5 | 5 | 5 | 5 | 5 | 5 | 5 | 5 |
| | Vulcanization | Temp. | 157° C. | 157° C. | 157° C. | 157° C. | 157° C. | 157° C. | 157° C. | 157° C. | 157° C. | 157° C. | 157° C. |
| | | Time | 15 min | 15 min | 15 min | 15 min | 15 min | 15 min | 15 min | 15 min | 15 min | 15 min | 15 min |

TABLE 2-continued

| Components | | Comparative Example | | | | | | | | | | |
|---|---|---|---|---|---|---|---|---|---|---|---|---|
| (pbw) | | 1 | 2 | 3 | 4 | 5 | 6 | 7 | 8 | 9 | 10 | 11 |
| Core outer layer formulation*4 | Polybutadiene (JSR BR11) | 100 | 100 | 100 | 100 | 100 | 100 | 100 | 100 | 100 | 100 | |
| | Zinc acrylate | 39.3 | 38.1 | 41.9 | 16.5 | 46.9 | 41.9 | 29.2 | 35.5 | 41.9 | 38.1 | |
| | Peroxide (1)* | 0.6 | 0.6 | 0.6 | 0.6 | 0.6 | 0.6 | 0.6 | 0.6 | 0.6 | 0.6 | |
| | Peroxide (2)* | 0.6 | 0.6 | 0.6 | 0.6 | 0.6 | 0.6 | 0.6 | 0.6 | 0.6 | 0.6 | |
| | Antioxidant* | 0.2 | 0.2 | 0.2 | 0.2 | 0.2 | 0.2 | 0.2 | 0.2 | 0.2 | 0.2 | |
| | Zinc oxide | 7.9 | 8.5 | 5.1 | 18.0 | 7.2 | 8.5 | 14.0 | 7.9 | 12.0 | 22.2 | |
| | Zinc salt of pentachlorothiophenol | 1 | 1 | 1 | 1 | 1 | 1 | 1 | 1 | 1 | 1 | |
| | Vulcanization Temp. | 157° C. | 157° C. | 157° C. | 157° C. | 157° C. | 157° C. | 157° C. | 157° C. | 157° C. | 157° C. | |
| | Time | 15 min | 15 min | 15 min | 15 min | 15 min | 15 min | 15 min | 15 min | 15 min | 15 min | |

*1 Peroxide (1): dicumyl peroxide, trade name Percumil D by NOF Corporation
*2 Peroxide (2): 1,1-bis(t-butylperoxy)-3,3,5-trimethylcyclohexane, trade name Perhexa 3M-40 by NOF Corporation
*3 Antioxidant: trade name Nocrac NS-6 by Ouchi Shinko Chemical Industry Co., Ltd.
*4 The composition was preformed into hemispherical shells using a mold, and the previously molded core inner layer was encased with a pair of the preformed shells, which were molded and vulcanized in a mold.

TABLE 3

| | Cover stock | | | | |
|---|---|---|---|---|---|
| Components (pbw) | 1 | 2 | 3 | 4 | 5 |
| Himilan 1706 | | | | 25 | |
| Himilan 1605 | | | | 25 | |
| Himilan 1855 | | | | | 50 |
| Surlyn 8120 | | | | | 50 |
| Pandex T7298 | | | 50 | 50 | |
| Pandex TR3080 | | | 50 | | |
| Pandex T8295 | 100 | 50 | | | |
| Pandex T8290 | | 50 | | | |
| Isocyanate compound | | | | 1.5 | 0.75 |
| Titanium dioxide | 4 | 4 | 4 | 4 | |
| Polyethylene wax | 1.5 | 1.5 | 1.5 | 0.75 | |
| Isocyanate mixture | 10 | 10 | | | |

Pandex: thermoplastic polyurethane elastomer by DIC Bayer Polymer Ltd.
Surlyn: ionomer resin by E.I. DuPont
Himilan: ionomer resin by DuPont-Mitsui Polychemicals Co., Ltd.
Isocyanate mixture: trade name Crossnate EM30, an isocyanate master batch of polyester elastomer as the base resin containing 30% 4,4'-diphenylmethane diisocyanate (isocyanate concentration of 5–10% as measured by amine back-titration according to JIS K1556), manufactured by Dainichi Seika Colour & Chemicals Mfg. Co., Ltd. On use, the isocyanate mixture was mixed with the remaining cover components just prior to injection molding.
Isocyanate Compound: trade name Desmodur W, hydrogenated MDI, i.e., dicyclohexylmethane-4,4'-diisocyanate, manufactured by ACI Japan Co., Ltd. On use, the isocyanate compound was previously mixed in an extruder.

TABLE 4

| | Example | | | | |
|---|---|---|---|---|---|
| | 1 | 2 | 3 | 4 | 5 |
| Core inner layer | | | | | |
| Outer diameter (mm) | 31.5 | 31.5 | 34.0 | 31.5 | 32.0 |
| Weight (g) | 17.6 | 17.6 | 22.7 | 17.9 | 18.6 |
| Specific gravity | 1.08 | 1.08 | 1.10 | 1.09 | 1.09 |
| Surface hardness (JIS C) | 79 | 77 | 76 | 77 | 78 |
| Center hardness H1 (JIS C) | 63 | 62 | 60 | 62 | 63 |
| Core outer layer | | | | | |
| Surface hardness H0 (JIS C) | 85 | 88 | 85 | 85 | 86 |
| Specific gravity | 1.14 | 1.14 | 1.12 | 1.13 | 1.14 |
| Gage (mm) | 4.2 | 3.7 | 3.0 | 4.2 | 4.2 |
| H0–H1 | 22 | 26 | 25 | 23 | 23 |
| Core | | | | | |
| Outer diameter (mm) | 39.9 | 38.9 | 40.0 | 39.9 | 40.3 |
| Weight (g) | 36.8 | 34.0 | 37.1 | 36.8 | 38.0 |
| Core outer layer/cover adhesive | yes | yes | yes | yes | yes |

TABLE 4-continued

|  | Example | | | | |
|---|---|---|---|---|---|
|  | 1 | 2 | 3 | 4 | 5 |
| Cover | | | | | |
| Cover stock | ① | ① | ① | ② | ② |
| Type | urethane | urethane | urethane | urethane | urethane |
| Gage (mm) | 1.4 | 1.9 | 1.4 | 1.4 | 1.2 |
| Specific gravity | 1.15 | 1.15 | 1.15 | 1.14 | 1.14 |
| Sheet hardness (Shore D) | 50 | 50 | 50 | 47 | 47 |
| Ball | | | | | |
| Outer diameter (mm) | 42.7 | 42.7 | 42.7 | 42.7 | 42.7 |
| Weight (g) | 45.4 | 45.4 | 45.4 | 45.4 | 45.4 |
| Flight performance (W#1/HS50) | | | | | |
| Carry (m) | 257.5 | 256.1 | 253.9 | 254.5 | 255.0 |
| Total (m) | 267.9 | 265.9 | 265.2 | 264.9 | 265.3 |
| Spin (rpm) | 2896 | 2834 | 2820 | 2968 | 2993 |
| Rating | ◯ | ◯ | ◯ | ◯ | ◯ |
| Control on approach shots (SW/HS20) | | | | | |
| Spin (rpm) | 5990 | 5890 | 5851 | 6101 | 6151 |
| Rating | ◯ | ◯ | ◯ | ◯ | ◯ |
| Feel | | | | | |
| W#1 | ◯ | ◯ | ◯ | ◯ | ◯ |
| PT | ◯ | ◯ | ◯ | ◯ | ◯ |
| Durability | | | | | |
| Durability against repeated shots until a decline of initial velocity | ◯ | ◯ | ◯ | ◯ | ◯ |
| Scuff resistance | ◯ | ◯ | ◯ | ◯ | ◯ |

TABLE 5

|  | Comparative Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Core inner layer | | | | | | | | | | | |
| Outer diameter (mm) | 32.0 | 32.0 | 32.0 | 32.0 | 31.5 | 33.0 | 31.5 | 32.0 | 32.0 | 31.5 | 38.5 |
| Weight (g) | 18.7 | 18.8 | 19.0 | 18.8 | 17.7 | 20.6 | 17.8 | 18.6 | 19.2 | 18.5 | 32.9 |
| Specific gravity | 1.09 | 1.10 | 1.11 | 1.10 | 1.08 | 1.09 | 1.08 | 1.09 | 1.12 | 1.13 | 1.10 |
| Surface hardness (JIS C) | 77 | 69 | 87 | 79 | 80 | 72 | 80 | 80 | 76 | 79 | 79 |
| Center hardness H1 (JIS C) | 62 | 54 | 70 | 63 | 64 | 57 | 64 | 64 | 60 | 63 | 63 |
| Core Outer layer | | | | | | | | | | | |
| Surface hardness H0 (JIS C) | 86 | 85 | 88 | 68 | 92 | 88 | 78 | 83 | 88 | 85 | |
| Specific gravity | 1.12 | 1.12 | 1.11 | 1.12 | 1.14 | 1.13 | 1.13 | 1.11 | 1.15 | 1.20 | |
| Gage (mm) | 3.0 | 3.7 | 3.8 | 3.8 | 4.2 | 3.5 | 3.7 | 3.5 | 3.5 | 3.8 | |
| H0–H1 | 24 | 31 | 18 | 5 | 28 | 31 | 14 | 19 | 28 | 22 | |
| Core | | | | | | | | | | | |
| Outer diameter (mm) | 37.9 | 39.3 | 39.5 | 39.5 | 39.9 | 39.9 | 38.8 | 39.0 | 39.0 | 39.0 | |
| Weight (g) | 31.3 | 35.1 | 35.6 | 35.6 | 36.8 | 36.8 | 33.7 | 33.9 | 35.1 | 36.0 | |
| Core outer layer/cover adhesive | yes | yes | yes | yes | yes | yes | yes | yes | yes | no | yes |
| Cover | | | | | | | | | | | |
| Cover stock Type | ① urethane | ① urethane | ① urethane | ① urethane | ① urethane | ① urethane | ① urethane | ③ urethane | ④ urethane/surlyn | ⑤ surlyn | ② urethane |
| Gage (mm) | 2.4 | 1.7 | 1.6 | 1.6 | 1.4 | 1.4 | 2.0 | 1.9 | 1.9 | 1.9 | 2.1 |
| Specific gravity | 1.15 | 1.15 | 1.15 | 1.15 | 1.15 | 1.15 | 1.15 | 1.18 | 1.06 | 0.97 | 1.15 |
| Sheet hardness (Shore D) | 50 | 50 | 50 | 50 | 50 | 50 | 50 | 45 | 57 | 53 | 47 |

TABLE 5-continued

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Ball | | | | | | | | | | | |
| Outer diameter (mm) | 42.7 | 42.7 | 42.7 | 42.7 | 42.7 | 42.7 | 42.7 | 42.7 | 42.7 | 42.7 | 42.7 |
| Weight (g) | 45.4 | 45.4 | 45.4 | 45.4 | 45.4 | 45.4 | 45.4 | 45.4 | 45.4 | 45.4 | 45.4 |
| Flight performance (W#1/HS50) | | | | | | | | | | | |
| Carry (m) | 253.1 | 247.3 | 257.9 | 251.8 | 256.0 | 252.7 | 252.8 | 254.0 | 253.4 | 256.5 | 255.5 |
| Total (m) | 262.3 | 258.6 | 263.0 | 261.5 | 266.6 | 263.1 | 263.3 | 262.4 | 265.5 | 267.8 | 263.0 |
| Spin (rpm) | 2845 | 2653 | 3078 | 2988 | 2889 | 2713 | 2964 | 3133 | 2530 | 2779 | 3047 |
| Rating | X | X | X | X | ○ | X | X | X | ○ | ○ | X |
| Control on approach shots (SW/HS20) | | | | | | | | | | | |
| Spin (rpm) | 5901 | 5825 | 6334 | 6086 | 6006 | 5667 | 6085 | 6382 | 5380 | 5597 | 6220 |
| Rating | ○ | ○ | ○ | ○ | ○ | ○ | ○ | ○ | X | Δ | ○ |
| Feel | | | | | | | | | | | |
| W#1 | ○ | X | X | ○ | ○ | ○ | ○ | ○ | ○ | ○ | ○ |
| PT | ○ | ○ | ○ | ○ | X | ○ | ○ | ○ | ○ | ○ | ○ |
| Durability | | | | | | | | | | | |
| Durability against repeated shots until a decline of initial velocity | ○ | X | ○ | X | ○ | X | ○ | ○ | X | ○ | ○ |
| Scuff resistance | ○ | ○ | ○ | ○ | Δ | ○ | ○ | ○ | X | X | ○ |

Note that "core" corresponds to the core outer layer enclosing the core inner layer, and "core outer layer/cover adhesive" is an adhesive between the core outer layer and the cover, RB-182 Primer manufactured by Nippon Bee Chemical Co., Ltd.

From the data shown in Tables 4 and 5, the balls were evaluated as follows.

Comparative Example 1, involving the core outer layer with a small diameter and the cover with a large gage, has less rebound and travels a short distance.

Comparative Example 2, in which the core inner layer has too low a center hardness, has drawbacks including (1) less rebound to travel a short distance, (2) a very soft feel when hit with a driver, and (3) poor crack durability against repeated shots.

Comparative Example 3, in which the core inner layer has too high a surface hardness, receives too much spin and travels a short distance on driver shots. The feel when hit with W#1 is too hard.

Comparative Example 4, in which the core outer layer has too low a surface hardness and H0-H1 is less than 20, receives too much spin and travels a short distance on driver shots. Since the core outer layer's surface hardness is lower than the core inner layer's surface hardness by at least 10 JIS-C hardness units, the crack durability against repeated shots is poor.

Comparative Example 5, in which the core outer layer has too high a surface hardness, provides a hard feel when hit with a putter and poor scuff resistance when hit with an iron.

Comparative Example 6, in which H0-H1 is too large, has less rebound, travels short, and has poor crack durability against repeated shots.

Comparative Example 7, in which H0-H1 is too small, travels short due to somewhat excess spin and relatively low rebound.

Comparative Example 8, in which the cover hardness is too low, receives too much spin and travels a short distance.

Comparative Example 9, in which the cover hardness is too high, receives less spin on approach shots and has poor scuff resistance and poor crack durability against repeated shots.

Comparative Example 10 with a cover of Surlyn has low spin receptivity, poor controllability and poor scuff resistance.

Comparative Example 11 of a two-piece structure receives much spin on W#1 shots and travels short.

In contrast, the golf balls of Examples within the scope of the invention mark acceptable levels of all travel distance, controllability, feel and durability.

Japanese Patent Application No. 2001-398997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A three-piece solid golf ball comprising a core inner layer formed of a rubber composition, a core outer layer enclosing the core inner layer and formed of another rubber composition, and a cover enclosing the core outer layer and formed mainly of a polyurethane elastomer, wherein
said core inner layer has a JIS-C hardness of 50 to 85, said core outer layer has a JIS-C hardness of 70 to 90, the difference between the JIS-C hardness H0 of said core outer layer at its surface and the JIS-C hardness H1 of said core inner layer at its center, given as H0-H1, is 20 to 30 units,
said cover has a Shore D hardness of 46 to 55 and a gage of 1.1 to 2.1 mm, and wherein said core inner layer has a specific gravity of more than 1.0, said core outer layer has a specific gravity which is equal to or greater than that of said core inner layer, and said cover has a specific gravity which is highest among others.

2. A three-piece solid golf ball comprising a core inner layer formed of a rubber composition, a core outer layer enclosing the core inner layer and formed of another rubber composition, and a cover enclosing the core outer layer and formed mainly of a polyurethane elastomer, wherein said core inner layer has a JIS-C hardness of 50 to 85, said core outer layer has a JIS-C hardness of 70 to 90, the difference between the JIS-C hardness H0 of said core outer layer at its surface and the JIS-C hardness H1 of said core inner layer at its center, given as H0-H1, is 20 to 30 units, said cover has a Shore D hardness of 46 to 55 and a gage of 1.1 to 2.1 mm, and wherein said cover is formed of a composition comprising, in admixture, the polyurethane elastomer and an isocyanate mixture of an isocyanate compound having at least two isocyanate groups as functional groups in a molecule, dispersed in a thermoplastic resin which is substantially non-reactive with the isocyanate groups.

3. A three-piece solid golf ball comprising a core inner layer formed of a rubber composition, a core outer layer enclosing the core inner layer and formed of another rubber composition, and a cover enclosing the core outer layer and formed mainly of a polyurethane elastomer, wherein said cover has a Shore D hardness of 46 to 55 and a gage of 1.1 to 2.1 mm, and said core inner layer has a specific gravity of more than 1.0, said core outer layer has a specific gravity which is equal to or greater than that of said core inner layer, and said cover has a specific gravity greater than the specific gravity of said core outer layer.

* * * * *